United States Patent

Shibuta

[11] Patent Number: 5,908,585
[45] Date of Patent: Jun. 1, 1999

[54] ELECTRICALLY CONDUCTIVE TRANSPARENT FILM AND COATING COMPOSITION FOR FORMING SUCH FILM

[75] Inventor: Daisuke Shibuta, Saitama, Japan

[73] Assignees: Mitsubishi Materials Corporation, Tokyo, Japan; Hyperion Catalysis International, Inc., Cambridge, Mass.

[21] Appl. No.: 09/051,803

[22] PCT Filed: Oct. 22, 1996

[86] PCT No.: PCT/JP96/03052

§ 371 Date: Apr. 23, 1998

§ 102(e) Date: Apr. 23, 1998

[87] PCT Pub. No.: WO97/15935

PCT Pub. Date: May 1, 1997

[30] Foreign Application Priority Data

Oct. 23, 1995 [JP] Japan ................................. 7-274313

[51] Int. Cl.⁶ .............................. H01B 1/18; H01B 1/24; B32B 5/02; B32B 27/20
[52] U.S. Cl. ........................ 252/506; 252/507; 252/508; 428/922; 428/924
[58] Field of Search ................................ 252/506, 507, 252/508; 428/922, 924

[56] References Cited

U.S. PATENT DOCUMENTS

| | | | |
|---|---|---|---|
| 4,663,230 | 5/1987 | Tennent | 428/367 |
| 5,098,771 | 3/1992 | Friend | 428/209 |
| 5,165,909 | 11/1992 | Tennent et al. | 423/447.3 |
| 5,171,560 | 12/1992 | Tennent | 423/447.3 |
| 5,504,133 | 4/1996 | Murouchi et al. | 524/430 |
| 5,549,849 | 8/1996 | Namura et al. | 252/503 |
| 5,585,037 | 12/1996 | Linton | 252/518 |

FOREIGN PATENT DOCUMENTS

| | | |
|---|---|---|
| WO 90/07023 | 6/1990 | European Pat. Off. . |
| WO 91/03057 | 3/1991 | European Pat. Off. . |
| WO 94/25966 | 11/1994 | European Pat. Off. . |

*Primary Examiner*—Mark Kopec
*Assistant Examiner*—Brian Mruk
*Attorney, Agent, or Firm*—Oblon, Spivak, McClelland, Maier & Neustadt, P.C.

[57] ABSTRACT

A transparent electrically conductive film having a surface resistivity of $10^2-10^{10}\Omega/\square$, an overall light transmittance of at least 70%, and a haze value of at most 20% comprises an organic or inorganic transparent matrix having dispersed therein 0.01%–1 wt % of hollow carbon microfibers and 1%–40 wt % of an electrically conductive metal oxide powder (such as antimony-doped tin oxide) with an average primary particle diameter of 0.5 μm or smaller. The matrix can be an organic polymer which is thermoplastic, thermosetting, or curable by ultraviolet radiation, or a metal oxide sol which can form an inorganic glass film, a hydrolyzable or heat decomposable organic metal compound, or the like.

9 Claims, No Drawings

ELECTRICALLY CONDUCTIVE TRANSPARENT FILM AND COATING COMPOSITION FOR FORMING SUCH FILM

TECHNICAL FIELD

The present invention relates to an electrically conductive transparent film, a coating composition for forming such a film, and an antistatic layer made of the transparent film. The conductive transparent film can be used as substrates of display devices such as LC or EL display devices, as transparent electrodes, and for shielding electromagnetic waves in electronic equipment. The film is also useful for providing various transparent structures with antistatic properties while keeping transparency of the structures. Examples of such transparent structures include, e.g., cathode ray tubes or TV's or the like, glass or transparent plastic panels for dust-proof interior or exterior partitions or show windows, recording materials such as photographic films or optical or magnetic recording devices, and packages for semiconductor chips and electronic elements.

BACKGROUND ART

An electrically conductive transparent film has conventionally been formed on an electrical insulating substrate either the following process (1) or (2):

(1) a dry process such as PVD (including sputtering and ion plating) or CVD to form a conductive transparent film of a metal oxide type, e.g., antimony-tin mixed oxide or tin-indium mixed oxide on a substrate;

(2) a wet process using a conductive coating composition comprising an electrically conductive powder, e.g., one of the above-described mixed oxides, and a binder.

The dry process (1) produces a film having both good transparency and good conductivity. However, it requires a complicated apparatus having a vacuum system and has poor productivity. Another problem of the dry process is that it is difficult to apply to a continuous or big substrate such as photographic films or show windows.

On the other hand, the wet process (2) is advantageous in that it requires a relatively simple apparatus, has high productivity, and is easy to apply to a continuous or big substrate.

The conductive powder used in the wet process is a very fine powder having an average primary particle diameter of 0.5 $\mu$m or less so as not to interfere with the transparency of the resulting film. However, such a fine powder is strong in binding power between particles and tends to re-agglomerate in a coating composition, thereby causing the coating composition to have a low stability.

Furthermore, since electric conductivity results from direct contact between powder particles, it is necessary for the conductive powder to be present in a dry film in a large proportion on the order of more than 50% by weight in order to provide the film with adequate electric conductivity. This increases the costs of a conductive film made by the wet process and leads to losses of physical (mechanical and thermal) properties of the film.

Carbon fibers, particularly graphitized carbon fibers have good electric conductivity and it has been attempted to use carbon fibers as a conductive material. In particular, those carbon fibers prepared by the vapor-phase growth (pyrolysis) method and optionally subjected to graphitization by heat treatment are attractive since they are hollow or solid thin fibers having an outer diameter of 0.1–10 $\mu$m and having high electric conductivity.

Recently, carbon fibers much thinner than the above-described fibers by the conventional vapor-phase growth method have been developed. See, Japanese Patent Kokoku Publications Nos. 3-64606 and 3-77288; Japanese Patent Kokai Applications Nos. 1-131251, 3-174018, and 5-125619; and U.S. Pat. Nos. 4,663,230; 5,165,909; and 5,171,560. Such very thin carbon fibers (hereinafter referred to as carbon microfibers) are hollow fibers having a hollow core and their outer diameter is in the range of several to several ten nanometers (nm). Due to the diameter on the order of nanometers, carbon microfibers are also called nanotubes or carbon fibrils. It has been proposed to use such fibers as a reinforcing material in the manufacture of composite materials, or to utilize their electrical conductivity and employ them in antistatic materials, electrodes, and shields against electromagnetic waves.

U.S. Pat. No. 5,098,771 describes an electrically conductive coating and ink containing hollow carbon microfibers. In the coating disclosed in that patent, in order to give the coating electrical conductivity, the hollow microfibers are employed in an amount of 1–4 wt % with respect to a binder resin.

An object of the present invention is to provide a transparent electrically conductive film which does not have the drawbacks of the above-described wet-process (2) and a coating composition for forming this transparent electrically conductive film.

More particularly, it is an object of the present invention to provide a transparent electrically conductive film having a reduced content of electrically conductive materials and a coating composition for forming the film.

Another object of the present invention is to provide an electrically conductive film which contains carbon fibers as an electrically conductive material while maintaining its transparency as well as a coating composition for forming the film.

Yet another object of the present invention is to provide a novel, transparent antistatic layer.

DISCLOSURE OF INVENTION

In an electrical conductive material containing carbon fibers as a conductive material, blackening is unavoidable due to the color of the carbon fibers, and the beauty of the material is worsened. Therefore, it was necessary to take some measures to make the entire conductor black so that the carbon fibers would not be visible. For this reason, as stated above with respect to method (2), in a transparent electrically conductive film, electrically conductive fine powders having an average primary particle diameter of 0.5 $\mu$m or smaller are generally used as a conductive material in order not to impair the transparency of the film. Thus, until now, it was not thought possible to use black carbon fibers in a transparent electrically conductive film.

The present inventors performed investigations of the properties of the above-described hollow carbon microfibers as an electrically conductive material. As a result, they made the unexpected discovery that even if the content of the microfibers in a film is reduced to as low as a few weight %, the microfibers can still impart electrical conductivity to the film, and if the content is reduced to 1 wt % or less, even though the hollow carbon microfibers in bulk themselves have the black color characteristic of carbon fibers, the film becomes transparent and moreover is imparted electrical conductivity. When the hollow carbon microfibers in a small amount of 1 wt % or less are used together with a transparent electrically conductive metal oxide powder, a transparent conductive film having increased conductivity is obtained.

According to one aspect, the present invention is a transparent electrically conductive film comprising an organic or inorganic transparent matrix having dispersed therein 0.01% –1% by weight of hollow carbon microfibers and 1%–40% by weight of a transparent electrically conductive metal oxide powder having an average primary particle diameter of 0.5 µm or smaller.

According to another aspect, the present invention is a coating composition for forming a transparent electrically conductive film (namely, a transparent electrically conductive coating composition) comprising a binder capable of forming an organic or inorganic transparent film, from 0.01%–1% by weight, based on the total solids content of the composition, of hollow carbon microfibers and from 1%–40% by weight, based on the total solids content of the composition, of a transparent electrically conductive metal oxide powder having an average primary particle diameter of 0.5 µm or smaller.

In the present invention, "transparent" means that the film has an overall light transmittance of at least 70% and a haze value of less than 20%.

BEST MODE FOR CARRYING OUT THE INVENTION

The hollow carbon microfibers which can be used as electrically conductive fibers are hollow carbon fibers obtained by a gaseous phase growth method having a fiber diameter of less than 100 nm (0.1 µm). Preferred hollow carbon microfibers and carbon fibrils described in U.S. Pat. No. 4,663,230 and Japanese Patent Kokoku Publications Nos. 3-64606 and 3-77288. These microfibers are hollow fibers having an outer diameter (a fiber diameter) of approximately 3.5–70 nm and an aspect ratio of at least 5, and are composed of graphite having a crystal structure in which the C axis is substantially perpendicular to the fiber axis.

A particularly preferred hollow carbon microfiber material for use in the present invention is available under the trademark Graphite Fibril from Hyperion Catalysis International, Inc. (USA). This is graphitic hollow microfibers having an outer diameter of 10–20 nm, an inner diameter of 5 nm or smaller, and a length of 100 to approximately 20,000 nm (0.1 to 20 µm). Preferred hollow carbon microfibers have a volume resistivity (all measurements of volume resistivity were made under a pressure 100 kg/cm$^2$) of at most 10Ω·cm and particularly at most 1Ω·cm.

The hollow carbon microfibers in this invention are present in an amount of 0.01–1 wt % based on the total weight of the transparent electrically conductive film. If the amount is less that 0.01 wt %, the electrical conductivity of the film is insufficient, while if the amount is greater than 1 wt %, the film is blackened and loses its transparency. The amount of the follow carbon microfibers is preferably 0.05–0.75 wt % and more preferably 0.1–0.5 wt %.

The reason why such a small amount as at most 1 wt % of carbon microfibers can impart electrical conductivity to a film is that, as described above, the fibers are extremely small in diameter and hollow. Electrical conduction occurs through the points of contact between electrically conductive materials. The smaller the diameter and the lower the bulk specific gravity (hollowness gives a low bulk specific gravity) of the electrically conductive fibers, the more contact points exist between fibers per unit weight. In order words, electrical conductivity can be imparted with a smaller amount of electrically conductive fibers. With conventional fat carbon fibers formed by a gaseous phase growth method and having a fiber outer diameter of at least 0.1 µm, electrical conductivity can not be imparted to a film using less than 1 wt % of carbon fibers. However, in the present invention, the carbon fibers are extremely small in diameter with an outer diameter of less than 0.1 µm and preferably 70 nm or smaller, and in addition they are hollow with a low bulk specific gravity, so the number of contact points between fibers per unit weight increases, and electrical conductivity can be obtained using 1 wt % or less.

The hollow carbon microfibers used in the present invention have an outer diameter which is smaller than the shortest wavelength of visible light. Therefore, visible light is not absorbed and passes through the fibers, so if an amount as small as 1 wt % or less of the microfibers is dispersed, it is thought that the blending of the carbon fibers does not essentially give an adverse effect on the transparency of the film.

A transparent electrically conductive film according to this invention further contains a transparent electrically conductive metal oxide powder in a matrix, in addition to the hollow carbon microfibers. As described above, the hollow carbon microfibers have the effect of producing a high electrical conductivity, so even if a transparent electrically conductive metal oxide powder is not included at all, a transparent electrically conductive film having a certain degree of electrical conductivity can be obtained. However, in the present invention, in order to further increase the electrical conductivity, 1–40 wt % of a transparent electrically conductive metal oxide powder are included in the film. As a result, the electrical conductivity of the film is further increased without decreasing the transparency thereof.

The transparent electrically conductive metal oxide powder is preferably a powder of any desired metal oxide having a volume resistivity of at most $10^7$ Ω·cm and an average primary particle diameter of 0.5 µm or smaller. The volume resistivity of the electrically conductive powder is more preferably at most $10^5$ Ω·cm.

Examples of electrically conductive metal oxides which can be used in the present invention include tin oxide, indium oxide, zinc oxide, titanium oxide, tungsten oxide, molybdenum oxide, vanadium oxide, and mixed oxides of these materials. The electrical conductivity of these conductive metal oxides can be increased by the addition of a different element to produce an oxygen deficiency, so another element can be added as necessary. Elements which are particularly effective as additives for this purpose are, for example, Al and In to zinc oxide; Sb, Nb, and halogens to tin oxide; and Nb and Ta to titanium oxide.

Examples of preferred metal oxides include tin oxide, antimony-tin mixed oxides, tin-indium mixed oxides, zinc oxide, aluminum-doped zinc oxide, titanium oxide, tungsten oxide, molybdenum oxide, and vanadium oxide. In order to reduce scattering of visible light and prevent a decrease in transparency, the average primary particle diameter of the powder is 0.5 µm or smaller, preferably 0.2 µm or smaller, and more preferably 0.1 µm or smaller.

Such a transparent conductive metal oxide powder can impart electrical conductivity and transparency to a film even when used alone. However, when used alone, in order to impart electrical conductivity, the amount employed exceeds 50 wt %, and a decrease in the strength and the transparency of the film can no be avoided. By using the transparent conductive metal oxide powder together with hollow carbon microfibers, electrical conductivity can be increased using the metal oxide in an amount of 1–40 wt %, and improvements in the film quality and its transparency can be obtained. The amount of the metal oxide powder employed in the composition is preferably 1–30 wt %.

A transparent film according to the present invention can be formed by applying a coating composition containing hollow carbon microfibers and transparent electrically conductive metal oxide powder in a binder capable of forming an organic or inorganic transparent film on a suitable substrate such as glass or transparent plastic and drying or curing the coated film by a suitable means depending on the binder which is employed. Upon drying or curing, the binder forms an organic or inorganic transparent matrix.

The amounts of hollow carbon microfibers and transparent electrically conductive metal oxide powder in the coating composition with respect to the total solids content of the composition are the same as the amounts given above with respect to the transparent electrically conductive film. Namely, the coating composition contains, with respect to the total solids content of the composition, 0.01–1 wt %, preferably 0.05–0.75 wt %, and more preferably 0.1–0.5 wt % of the hollow carbon microfibers and 1–40 wt % and preferably 1–30 wt % of the transparent electrically conductive metal oxide powder.

The binder can be any type of organic or inorganic binder conventionally used in electrically conductive coating compositions, i.e., a transparent organic or inorganic polymer or a precursor thereof.

An organic binder can be thermoplastic or thermosetting or radiation-curable one which is set by radiation such as ultraviolet rays or electron beams. Examples of a suitable organic binder include organic polymers such as vinyl resins (e.g., polyvinyl chloride, polyvinyl acetate, polyvinyl acrylate, polyvinylidene chloride), polyesters, acrylic resins, urethane resins, epoxy resins, polycarbonates, melamine resins, polybutyrals, polyimides, polysulfones, polyphenylene oxides, proteinaceous materials (e.g., gelatin, casein), cellulose polymers (e.g., cellulose acetate), and silicone polymers, and precursors of these polymers (monomers and oligomers). They can form an organic polymer transparent film simply by evaporation of a solvent, by heat curing, or by curing using light or radiation.

Preferred organic polymer binders are unsaturated compounds which are curable by radical polymerization upon exposure to radiation or light. These are monomers, oligomers, or polymers having a vinyl or vinylidene group. Examples of such monomers are styrene and its derivatives such as methylstyrene, acrylic acid or methacrylic acid or derivatives thereof such as alkyl acrylates or alkyl methacrylates, allyl acrylate or allyl methacrylate, vinyl acetate, acrylonitrile, and itaconic acid. Preferred oligomers or polymers have a double bond in their backbone, or an acryloyl or methacryloyl group on each end of a straight chain backbone. This type of radical polymerization curable binder has a high hardness and excellent resistance to scratches and can form an electrically conductive film having high transparency.

Examples of an inorganic polymer binder include sols of metal oxides such as silica, tin oxide, aluminum oxide, and zirconium oxide (these sols are a type of inorganic polymer with metal-oxygen bonds), as well as hydrolyzable or pyrolyzable organophosphorus and organoboron compounds and organometallic compounds such as organosilane, organotitanium, organozirconium, organolead, and organoalkaline earth metal compounds, which serve as a precursor of an inorganic polymer. Examples of a hydrolyzable or pyrolyzable organometallic compound are alkoxides or partial hydrolyzates thereof, lower carboxylates such as acetates, and organometallic complexes such as acetyl acetonate complex.

If one or more of these inorganic polymer binders are baked, a glassy inorganic polymeric transparent film (matrix) formed from an oxide or a mixed oxide can be formed. The resulting inorganic polymeric matrix is in generally glassy with a high hardness, excellent scratch resistance, and a high degree of transparency.

A coating composition according to this invention typically uses a solvent. When using an organic polymer binder which is curable by light or radiation, however, solvent-free coating compositions can be formed by selecting a binder which is liquid at room temperature. Such a binder may either be used singly so as to form a 100% reactive binder system or diluted with an unreactive liquid resin. As a result, no vaporization of solvent is necessary during curing or drying of the film, so the curing time is greatly shortened, and procedure for solvent recovery is eliminated.

The solvent, when used, may be any solvent capable of dissolving the binder. When the binder is an organic polymer binder, useful solvents includes hydrocarbons such as toluene, xylene, and octane, chlorinated hydrocarbons such as methylene chloride, ethylene chloride, and chlorobenzene, ethers such as dioxane and methyl cellosolve, ether-alcohols such as ethoxy ethanol and tetrahydrofuran, esters such as methyl acetate and ethyl acetate, ketones such as cyclohexanone and methyl ethyl ketone, alcohols such as ethanol, isopropyl alcohol, phenol, and cresol, carboxylic acids such as acetic acid, amines such as triethyl amine and methanol amine, amides such as dimethylformamide, and sulfur-containing compounds such as dimethyl sulfoxide. When the organic polymer is a hydrophilic organic polymer or when using an inorganic polymer binder, a polar solvent such as water, an alcohol, or an amine is normally used. The amount of solvent should be enough to obtain a coating composition having a viscosity suitable for coating.

In addition to the above-described hollow carbon microfibers, transparent conductive oxide powder, a binder, and a solvent, the coating composition may contain appropriate additives such as a dispersing agent (a surfactant) a coupling agent, a crosslinking agent, a stabilizer, an anti-settling agent, a colorant, a charge adjusting agent, and/or a lubricant. There are no particular limits on the types or amounts thereof.

A coating composition according to this invention can be manufactured by mixing the above-described components in a mixing machine, such as a ball mill, sand mill, roll mill, attrition mill, or paint shakers which is normally used in the manufacture of coating compositions.

The composition can be coated by known coating methods, such as bar coating, spraying, roll coating, spin coating, dipping, the air knife method, gravure -printing, and screen printing. There is no particular restriction on the type of substrate, but an electrically insulating and transparent substrate, such as glass or transparent plastic, is preferable.

After coating, the wet coating is dried or cured with heating, if necessary, to give a transparent electrically conductive film according to this invention. The heating conditions can be suitably determined in accordance with the type of binder. When the binder is light- or radiation-curable, the coating is cured by irradiation with light or radiation immediately after coating. Ionizing radiation such as electron beams, ultraviolet light, X-rays, and gamma rays can be used as the radiation. The dose of irradiation can be determined according to the type of binder.

There is no particular limit on the thickness of the transparent electrically conductive film according to the present invention, but normally it is 0.1–10 μm and preferably 0.2–5 μm. The electrically conductive coating has an overall light transmittance of at least 70% and a haze value of at most 20%. Preferably, the overall light transmittance is at least 80% and more preferably at least 85%, while the haze value is preferably at most 10%.

Even though the conductive film of this invention contains conductive fibers at an extremely low level of at most 1 wt % and conductive metal oxide powder at a low level of 1–40 wt %, it generally has a low surface resistivity (namely, a high electrical conductivity) in the range of $10^2$–$10^{10}\Omega/\square$ and preferably in the range of $10^2$–$10^8\Omega/\square$. The ranges shown here for surface resistivity are for a film thickness of the electrically conductive film of at least 1 μm, i.e., for the case in which the film is sufficiently thick that the surface resistivity does not vary with the film thickness (if the film thickness in less than 1 μm, the surface resistivity varies with the film thickness).

An electrically conductive film according to this invention is particularly suitable for use as a transparent antistatic layer. This transparent antistatic layer can be installed on at least one surface of various films, sheets, and panels. Such products for which antistatic properties are necessary or desirable include recording media such as photographic film, electrophotographic media, magnetic recording media, and optical recording media, and packing materials for semiconductor elements and electronic parts. Furthermore, it can be attached to show windows, transparent partitions (particularly in clean rooms), and to transparent plastic products in order to prevent the adhesion of dust. Compared to conventional transparent antistatic layers, an antistatic layer formed from the transparent conductive film of the present invention has greater thermal stability due to the carbon fibers used as a conducting material, and as the content of conducting materials is low, the physical properties and the durability of the film are improved, so it has excellent long-term antistatic properties.

In addition to being used as an antistatic layer, a transparent conductive film according to the present invention can be used to form substrates for displays, transparent electrodes, and shields against electromagnetic waves for electronic equipment.

EXAMPLES

The present invention will be illustrated by the following examples, which should be considered as illustrative and not restrictive.

The hollow carbon microfibers used in the examples were those sold by Hyperion Catalysis International, Inc. under the tradenames Graphite Fibril BN and CC. Graphite Fibril BN is a hollow fiber having an outer diameter of 0.015 μm (15 nm), an inner diameter of 0.005 μm (5 nm), and a length of 0.1–10 μm (100–10,000 nm). In bulk, it has a volume resistivity of 0.2Ω·cm. Graphite Fibril CC is a hollow fiber having an outer diameter of 0.015 μm (15 nm), an inner diameter of 0.005 μm (5 nm), and a length of 0.2–20 μm (200–20,000 nm). In bulk, it has a volume resistivity of 0.1Ω·cm.

For comparison, carbon black #3950 (abbreviated as CB) sold by Mitsubishi Chemical was employed as a conventional carbonaceous conductive material.

The transparent conductive metal oxide powder used in the examples were antimony-doped tin oxide powder (abbreviated as ATO) and tin-doped indium oxide powder (abbreviated as ITO). The ATO powder is available from Mitsubishi Materials under the tradename T-1. It had an average primary particle diameter of 0.02 μm (20 nm) and a volume resistivity of 1.5Ω·cm. The ITO powder is also available from Mitsubishi Materials and had an average primary particle diameter of 0.03 μm (30 nm) and a volume resistivity of 0.05Ω·cm.

In each example, the surface resistivity of the conductive film was measured at 50% relative humidity using an insulation-resistance tester (Model SM 8210 manufactured by Toa Denpa), and the transparency was measured using a haze meter (a direct reading haze computer manufactured by Suga Test Instruments) in terms of overall light transmittance and as a haze value.

Example 1

0.5 g of Graphite Fibril BN and 66 g of ATO powder were dispersed in 350 g of methyl ethyl ketone and 50 g of cyclohexanone containing 100 g (as solids) of a thermoplastic polyester resin (Byron 200 manufactured by Toyobo) for 4 hours in a sand mill (using glass beads with a diameter of 1 mm) to prepare an electrically conductive coating composition containing, based on the total solids content, 0.3 wt % of graphite fibrils and 39.7 wt % of ATO powder.

The coating composition was applied atop a polyester film with a bar coater to a dry film thickness of 1 μm. It was then dried at room temperature to form a transparent conductive film on the polyester film. The transparent conductive film had a surface resistivity of $1\times10^9\Omega/\square$, an overall light transmittance of 88%, and a haze value of 8.5%.

Following the above procedure, a conductive coating composition was prepared and a transparent conductive film was formed while varying the amount of graphite fibrils and ATO powder or the film thickness, or by omitting the graphite fibrils, or by replacing the graphite fibrils with electrically conductive carbon black. The composition of the transparent electrical conductive film and its conductivity and transparency are shown in Table 1.

The results of an example performed in the above manner using Graphite Fibril CC are shown in Table 2.

As can be seen from Tables 1 and 2, when only ATO powder was blended as an electrically conductive material, in an amount of 40 wt %, the resulting transparent film had no substantial electrical conductivity, and even if the amount of ATO powder was increased to 55 wt %, the electrical conductivity was still low. When carbon black was used instead of hollow microfibers, the film was blackened and lost transparency. In contrast, according to the present invention, when at most 1 wt % of hollow carbon microfibers was blended with ATO powder, a film having a high conductivity and excellent transparency be obtained using 40 wt % or less of ATO powder.

TABLE 1

| | | | | | | Transparency | | |
|---|---|---|---|---|---|---|---|---|
| Run No. | Composition (wt %) | | | | Thickness (μm) | Surface Resistance ($\Omega/\square$) | % Transmit. | Haze |
| | Resin | GF | CB | ATQ | | | | |
| 1 | 60 | 0.3 | — | 39.7 | 1 | $1 \times 10^9$ | 88 | 8.5 | TI |
| 2 | 60 | 0.8 | — | 39.2 | 1 | $8 \times 10^7$ | 88 | 8.9 | TI |
| 3 | 60 | 0.8 | — | 39.2 | 5 | $3 \times 10^8$ | 87 | 9.9 | TI |
| 4 | 70 | 0.8 | — | 29.2 | 1 | $2 \times 10^8$ | 88 | 9.4 | TI |
| 5 | 60 | — | — | 40 | 1 | $>10^{12}$ | 86 | 11 | CO |
| 6 | 45 | — | — | 55 | 1 | $7 \times 10^{11}$ | 85 | 10 | CO |
| 7 | 60 | — | 1.0 | 39 | 1 | $>10^{12}$ | Blackened | | CO |

Resin: Polyester; GF = Graphite Fibril BN; CB = Carbon Black
TI = This Invention; CO = Comparative

TABLE 2

| Run No. | Composition (wt %) | | | Thickness (μm) | Surface Resistance (Ω/□) | Transparency | | |
|---|---|---|---|---|---|---|---|---|
| | Resin | GF | ATO | | | % Transmit. | Haze | |
| 1 | 60 | 0.1 | 39.9 | 1 | $2 \times 10^9$ | 88 | 6.4 | TI |
| 2 | 60 | 0.3 | 39.7 | 1 | $4 \times 10^8$ | 88 | 6.7 | TI |
| 3 | 60 | 0.5 | 39.5 | 1 | $2 \times 10^7$ | 88 | 6.8 | TI |
| 4 | 60 | 0.5 | 39.5 | 0.4 | $8 \times 10^8$ | 89 | 5.6 | TI |
| 5 | 60 | 0.5 | 39.5 | 5 | $9 \times 10^5$ | 88 | 8.1 | TI |

Resin: Polyester; GF = Graphite Fibril CC
TI = This Invention

Example 2

0.71 g of Graphite Fibril CC and 42 g of ITO powder were dispersed in 100 g of toluene, 90 g of methyl ethyl ketone, 50 g ethyl acetate, and 30 g of acetone containing 100 g (as solids) of an acrylic resin (Acrylic 2000 manufactured by Kansai Paint) for 4 hours in a sand mill (using glass beads measuring 1 mm in diameter) to prepare a conductive coating composition containing, based on the total solids content, 0.5 wt % of graphite fibrils and 29.5 wt % of ITO powder.

The coating composition was applied atop a polyester film with a bar coater to a dry film thickness of 1 μm. It was then dried at room temperature to form a transparent conductive film atop the polyester film. The film had a surface resistivity of $2 \times 10^5 \Omega/□$, an overall light transmittance of 86%, and a haze of 4.3%.

Following the above procedure, a transparent conductive coating composition was prepared and a transparent electrically conductive film was formed while varying the amount of graphite fibrils and ITO powder or the film thickness. The composition of the transparent conductive film and its conductivity and transparency are shown in Table 3. From Table 3, it can be seen that even if the amount of ITO powder is reduced to near 1 wt %, the electrical conductivity of the film is still maintained at a high level.

TABLE 3

| Run No. | Composition (wt %) | | | Thickness (μm) | Surface Resistance (Ω/□) | Transparency | | |
|---|---|---|---|---|---|---|---|---|
| | Resin | GF | ITO | | | % Transmit. | Haze | |
| 1 | 70 | 0.5 | 29.5 | 1 | $2 \times 10^5$ | 86 | 4.3 | TI |
| 2 | 70 | 0.9 | 29.1 | 1 | $9 \times 10^3$ | 84 | 8.9 | TI |
| 3 | 70 | 0.9 | 29.1 | 5 | $4 \times 10^2$ | 82 | 9.9 | TI |
| 4 | 70 | 0.05 | 29.95 | 1 | $8 \times 10^9$ | 86 | 4.2 | TI |
| 5 | 97.5 | 0.9 | 1.6 | 1 | $7 \times 10^4$ | 84 | 9.4 | TI |

Resin: Acrylic resin; GF = Graphite Fibril CC
TI = This Invention

Example 3

0.77 g of Graphite Fibril BN and 49 g of ATO powder were dispersed in 150 g of distilled water for 5 hours in a sand mill (using glass bends measuring 1 mm in diameter). The resulting fiber/powder dispersion was poured into 1333 g of an aqueous 7.5 wt % gelatin solution (100 g as solids) while the temperature was maintained at 45° C. to prepare a conductive coating composition containing, based on the total solids content, 0.5 wt % of graphite fibrils and 34.5 wt % of ATO powder.

The coating composition was applied atop a polyester film with a bar coater to a dry film thickness of 0.2 μm. It was then dried at room temperature to form a transparent conductive film atop the polyester film. The film had a surface resistivity of $5 \times 10^8 \Omega/□$, an overall light transmittance of 89%, and a haze value of 3.6%.

Following the above procedure, a conductive coating composition was prepared and a transparent conductive film was formed while varying the amount of graphite fibrils and ATO powder or the film thickness, or by omitting the graphite fibrils. The composition of the transparent conductive film and its conductivity and transparency are shown in Table 4.

TABLE 4

| No. | Composition (wt %) | | | Thickness (μm) | Surface Resistance (Ω/□) | Transparency | | |
|---|---|---|---|---|---|---|---|---|
| | Binder | GF | ATO | | | % Transmit. | Haze | |
| 1 | 65 | 0.5 | 34.5 | 0.2 | $5 \times 10^8$ | 89 | 3.6 | TI |
| 2 | 65 | 0.5 | 34.5 | 0.6 | $9 \times 10^7$ | 89 | 3.8 | TI |
| 3 | 65 | — | 35 | 0.6 | $>10^{12}$ | 89 | 3.7 | CO |

Binder = Gelatin; GF = Graphite Fibril BN
TI = This Invention; CO = Comparative

Example 4

0.06 g of Graphite Fibril CC and 25 g of ATO powder were dispersed in 100 g (as solids) of a UV-curable acrylic resin (INC-200R manufactured by Nihon Kayaku) in the same manner as in Example 1 to obtain an electrically conductive coating composition containing, based on the total solids content, 0.05 wt % of graphite fibrils and 19.95 wt % of ATO powder.

The coating composition was applied atop a polycarbonate plate by spin coating to a dry film thickness of 2 μm. It was then irradiated with ultraviolet light from a high pressure mercury vapor lamp to cure the coated film and form a transparent conductive film atop the polycarbonate plate. The film had a surface resistivity of $8 \times 10^9 \Omega/□$, an overall light transmittance of 91%, and a haze value was 2.4%.

Following the above procedure, a conductive coating composition was prepared and a transparent conductive film was formed while varying the amount of graphite fibrils and ATO powder or the film thickness, or by omitting the graphite fibrils or the ATO powder. The composition of the transparent conductive film and its conductivity and transparency are shown in Table 5. An electrically conductive film having excellent transparency with a particularly low haze value was obtained.

TABLE 5

| Run No. | Composition (wt %) | | | Thickness (μm) | Surface Resistance (Ω/□) | Transparency | | |
|---|---|---|---|---|---|---|---|---|
| | Resin | GF | ATO | | | % Transmit. | Haze | |
| 1 | 80 | 0.05 | 19.95 | 2 | $8 \times 10^9$ | 91 | 2.4 | TI |
| 2 | 95 | 0.2 | 4.8 | 2 | $4 \times 10^8$ | 89 | 2.9 | TI |
| 3 | 97 | 0.8 | 2.2 | 2 | $9 \times 10^6$ | 88 | 3.2 | TI |

TABLE 5-continued

| Run No. | Composition (wt %) | | | Thickness (μm) | Surface Resistance (Ω/□) | Transparency | | |
|---|---|---|---|---|---|---|---|---|
| | Resin | GF | ATO | | | % Transmit. | Haze | |
| 4 | 60 | — | 40 | 2 | >$10^{12}$ | 87 | 3.1 | CO |
| 5 | 99.2 | 0.2 | — | 2 | $1 \times 10^{11}$ | 87 | 3.2 | CO |

Resin = UV-Curable Acrylic Resin; GF = Graphite Fibril CC
TI = This Invention; CO = Comparative Example 5

0.13 g of Graphite Fibril CC and 25 g of ATO powder were disperse in 150 g of distilled water for 5 hours in a sand mill (using glass beads with a diameter of 1 mm). To the resulting fiber/powder dispersion, 1200 g of methanol and then 346 g of ethyl silicate (silicon tetraethoxide) were added with stirring. The dispersion was acidified to pH 2 with nitric acid so as to partially hydrolyze ethyl silicate and obtain an electrically conductive coating composition. The coating composition contained, based on the total solids content, 80 wt % (as $SiO_2$) of partially hydrolyzed ethyl silicate, 0.1 wt % of graphite fibrils, and 19.9 wt % of ATO powder.

The coating composition was applied atop a glass plate by spin coating, and dried at 60° C. and then baked at 350° C. to give a 0.2 μm-thick transparent conductive film on the glass plate. The film had a surface resistivity of $3 \times 10^9 \Omega/\square$, an overall light transmittance of 92%, and a haze value of 1.9%. By using an inorganic matrix, an electrically conductive film of high transparency was obtained.

Industrial Applicability

In accordance with the present invention, by dispersing hollow carbon microfibers in an extremely small amount of 0.01–1 wt % along with 1–40 wt % of a transparent conductive metal oxide powder in a binder to form a coating, in spite of containing carbon fibers, transparency can be maintained, and a transparent conductive film having high electrical conductivity can be obtained using a small amount of metal oxide powder. A transparent conductive film according to this invention uses a small quantity of electrically conductive materials, so it has excellent economy, and a decrease in the strength and adhesion of the film caused by containing large quantities of powder can be prevented. Accordingly, it is possible to provide a high performance transparent electrically conductive film at low cost. A transparent electrically conductive film according to this invention can be used in various applications as an antistatic layer.

I claim:
1. An electrically conductive transparent film comprising an organic or inorganic transparent matrix having, dispersed therein, 0.01%–1% by weight of hollow carbon microfibers and 1%–40% by weight of a transparent electrically conductive metal oxide powder having an average primary particle diameter of 0.5 μm or smaller.

2. The conductive transparent film of claim 1, wherein said carbon microfibers have an outer diameter of 3.5–70 nm and an aspect ratio of at least 5.

3. The conductive transparent film of claim 1, wherein said transparent electrically conductive metal oxide powder is selected from the group consisting of powders of tin oxide, antimony-tin mixed oxides, tin-indium mixed oxides, zinc oxide, aluminum-doped zinc oxide, titanium oxide, tungsten oxide, molybdenum oxide, and vanadium oxide and wherein it has an average primary particle diameter of 0.2 μm or less and a volume resistivity of at most $10^7 \Omega \cdot cm$ as measured at a pressure of 100 kg/cm².

4. The conductive transparent film of claim 1, wherein said matrix is formed from a light- or radiation-curable organic polymer.

5. An electrically conductive transparent film-forming coating composition, comprising a binder capable of forming an organic or inorganic transparent film, 0.01%–1% by weight, based on the total solids content of the composition, of hollow carbon microfibers, and 1%–40% by weight, based on the total solids content of the composition, of an electrically conductive transparent metal oxide powder having an average primary particle diameter of 0.5 μm or smaller.

6. The coating composition of claim 5, wherein said carbon microfibers have an outer diameter of 3.5–70 nm and an aspect ratio of at least 5.

7. The coating composition of claim 5, wherein said electrically conductive transparent metal oxide powder is selected from the group consisting of powders of tin oxide, antimony-tin mixed oxides, tin-indium mixed oxides, zinc oxide, aluminum-doped zinc oxide, titanium oxide, tungsten oxide, molybdenum oxide, and vanadium oxide and wherein it has an average primary particle diameter of 0.2 μm or less and a volume resistivity of at most $10^7 \Omega \cdot cm$ as measured at a pressure of 100 kg/cm².

8. A transparent antistatic layer made of the electrically conductive transparent film of claim 1 to 4.

9. A transparent organic or inorganic film, sheet, or panel having, on at least one surface thereof, the transparent antistatic layer of claim 8.

* * * * *